(12) United States Patent
Westerbeke, Jr.

(10) Patent No.: US 7,832,196 B2
(45) Date of Patent: Nov. 16, 2010

(54) ELECTRONIC EMISSIONS CONTROL (75) Inventor: John H. Westerbeke, Jr., Milton, MA (US)

(73) Assignee: WBIP, LLC, Taunton, MA (US)

( * ) Notice: Subject to any disclaimer, the term of this patent is extended or adjusted under 35 U.S.C. 154(b) by 170 days.

(21) Appl. No.: 10/974,380

(22) Filed: Oct. 27, 2004

(65) Prior Publication Data

US 2005/0120705 A1 Jun. 9, 2005

Related U.S. Application Data

(60) Provisional application No. 60/515,166, filed on Oct. 27, 2003.

(51) Int. Cl.
*F01N 3/00* (2006.01)
(52) U.S. Cl. .............................. 60/285; 60/274; 60/276; 60/310
(58) Field of Classification Search .................. 60/274, 60/276, 285, 299, 310; 440/88 G, 88 J, 89 B, 440/89 C, 89 H, 89 R
See application file for complete search history.

(56) References Cited

U.S. PATENT DOCUMENTS

| | | | |
|---|---|---|---|
| 3,791,146 A | | 2/1974 | Hayashi |
| 3,967,941 A | | 7/1976 | Terao |
| 4,707,984 A | * | 11/1987 | Katsuno et al. ............... 60/274 |
| 4,884,066 A | * | 11/1989 | Miyata et al. ................ 340/633 |
| 4,900,282 A | | 2/1990 | Takahashi et al. |
| 4,997,399 A | | 3/1991 | Nakayasu et al. |
| 5,125,231 A | | 6/1992 | Patil et al. |
| 5,203,167 A | | 4/1993 | Lassanske et al. |
| 5,359,853 A | | 11/1994 | Shimizu |
| 5,364,322 A | | 11/1994 | Fukui |
| 5,408,827 A | | 4/1995 | Holtermann et al. |
| 5,536,477 A | | 7/1996 | Cha et al. |
| 5,554,057 A | | 9/1996 | Abe et al. |
| 5,609,023 A | | 3/1997 | Katoh et al. |
| 5,619,852 A | * | 4/1997 | Uchikawa .................... 60/276 |
| 5,715,794 A | * | 2/1998 | Nakamura et al. .......... 123/305 |
| 5,787,847 A | | 8/1998 | Ozawa et al. |

(Continued)

FOREIGN PATENT DOCUMENTS

WO     WO 97/47863     12/1997

(Continued)

OTHER PUBLICATIONS

Caroll, J.N., "Marine Gasoline Engine and Boat Testing," Final Report Prepared for the Environmental Protection Agency, EPA Contract 68-C-98-158, Sep. 2002.

(Continued)

*Primary Examiner*—Thomas E. Denion
*Assistant Examiner*—Diem Tran
(74) *Attorney, Agent, or Firm*—Fish & Richardson P.C.

(57) ABSTRACT

A method of controlling emissions from an internal combustion engine including governing engine speed with respect to a constant speed, maintaining an air/fuel ratio of the engine, flowing exhaust from the engine through an exhaust system containing a catalyst, monitoring a variable with a feedback sensor located upstream of the catalyst, and controlling the air/fuel ratio of the engine as a function of the variable. In one application, the engine is configured for marine applications, including electric power generation and propulsion.

39 Claims, 5 Drawing Sheets

U.S. PATENT DOCUMENTS

| | | | |
|---|---|---|---|
| 5,788,547 A | 8/1998 | Ozawa et al. | |
| 5,797,775 A | 8/1998 | Ozawa et al. | |
| 5,808,245 A | 9/1998 | Wiese et al. | |
| 5,809,773 A | 9/1998 | Gottberg | |
| 5,813,222 A | 9/1998 | Appleby | |
| 5,902,158 A * | 5/1999 | Nakase et al. | 440/88 R |
| 5,911,609 A * | 6/1999 | Fujimoto et al. | 440/89 R |
| 5,911,610 A | 6/1999 | Fujimoto | |
| 5,921,076 A | 7/1999 | Krutzsch et al. | |
| 5,937,637 A | 8/1999 | Fujishita et al. | |
| 6,044,643 A | 4/2000 | Ittner et al. | |
| 6,047,542 A | 4/2000 | Kinugasa et al. | |
| 6,053,785 A | 4/2000 | Kato et al. | |
| 6,120,335 A | 9/2000 | Nakase et al. | |
| 6,122,909 A | 9/2000 | Murphy et al. | |
| 6,122,910 A | 9/2000 | Hoshi et al. | |
| 6,212,879 B1 * | 4/2001 | Nishimura et al. | 60/274 |
| 6,309,268 B1 | 10/2001 | Mabru | |
| 6,321,530 B1 * | 11/2001 | Hoshi et al. | 60/274 |
| 6,432,368 B1 | 8/2002 | Feitelberg et al. | |
| 6,435,925 B1 | 8/2002 | Mabru | |
| 6,446,431 B1 | 9/2002 | Bruck | |
| 6,461,208 B2 | 10/2002 | Suzuki et al. | |
| 6,511,355 B1 | 1/2003 | Woodward | |
| 6,524,150 B2 | 2/2003 | Ozawa | |
| 6,551,155 B2 | 4/2003 | Lecours et al. | |
| 6,579,137 B2 | 6/2003 | Mabru | |
| 6,591,183 B2 | 7/2003 | Ishikawa et al. | |
| 6,655,341 B2 | 12/2003 | Westerbeke, Jr. | |
| 6,662,555 B1 * | 12/2003 | Ishii | 60/302 |
| 6,752,672 B2 * | 6/2004 | Kanno | 440/84 |
| 6,799,422 B2 | 10/2004 | Westerbeke, Jr. et al. | |
| 6,818,120 B2 | 11/2004 | Nakamichi et al. | |
| 6,820,419 B2 | 11/2004 | Ford et al. | |
| 2002/0038177 A1 | 3/2002 | Ishikawa et al. | |

FOREIGN PATENT DOCUMENTS

WO      WO 0245189      6/2002

OTHER PUBLICATIONS

Graham, C.R. et al., "General Motors High Performance 4.3L V6 Engine," SAE Technical Paper Series No. 920676, Feb. 1992.

Rashid, Ishtiaque I., "Office Action", Application No. 2,543,780, Apr. 2, 2009 (3 pages).

USPTO Non-Final Office Action in U.S. Appl. No. 11/624,536, mailed Apr. 23, 2007, 7 pages.

Fish & Richardson P.C., Amendment in Reply to Action dated Apr. 23, 2007 in U.S. Appl. No. 11/624,536, filed Jun. 21, 2007, 10 pages.

USPTO Final Office Action in U.S. Appl. No. 11/624,536, mailed Jul. 17, 2007, 7 pages.

Fish & Richardson P.C., Amendment in Reply to Action dated Jul. 17, 2007 in U.S. Appl. No. 11/624,536, filed Sep. 6, 2007, 6 pages.

USPTO Non-Final Office Action in U.S. Appl. No. 11/624,577, mailed Jun. 12, 2009, 7 pages.

Fish & Richardson P.C., Amendment in Reply to Action dated Jun. 12, 2009 in U.S. Appl. No. 11/624,577, filed Sep. 11, 2009, 5 pages.

USPTO Final Office Action in U.S. Appl. No. 11/624,577, mailed Jan. 8, 2010, 8 pages.

* cited by examiner

ELECTRONIC EMISSIONS CONTROL

CLAIM OF PRIORITY

This application claims priority under 35 U.S.C. §119(e) to U.S. Provisional Patent Application Ser. No. 60/515,166, filed on Oct. 27, 2003, the entire contents of which are hereby incorporated by reference.

TECHNICAL FIELD

This invention relates to controlling emissions from internal combustion engines.

BACKGROUND

Reducing combustion engine exhaust emissions is a continual object of research and development, driven both by awareness of environmental effects and increased government regulation. Some of the most effective and cost-efficient emissions controls involve the use of downstream chemical catalysts that further oxygenate incompletely combusted compounds. Sometimes exhaust is directed sequentially through multiple catalyst beds. It is generally understood that higher catalyst temperatures provide more effective emissions control. Much exhaust catalysis development has been focused on developing catalytic converters for automotive applications, in which engine speed varies substantially with vehicle speed and gear selection.

In several other applications, such as in powering fixed-frequency electrical generators, engine speed is held as constant as possible during use, even while generator and engine loads fluctuate. Some engine-generator sets are designed for installation on-board moving vehicles, either on land or in water.

Marine generators are subjected to specific regulations, both for emissions and for safety concerns. For example, exposed engine surface temperatures (including exhaust system surface temperatures) must be kept low to avoid increased risk of fire hazard. Seawater is injected into many marine engine exhaust flows so as to cool exiting exhaust gases, and seawater is also frequently circulated through exhaust system components so as to maintain low surface temperatures.

Further improvements in exhaust emissions controls for constant and variable speed engine applications are desired, particularly improvements suitable for marine use.

SUMMARY

Many aspects of the invention feature methods of controlling emissions from an internal combustion engine.

In one aspect, the method includes governing engine speed with respect to a constant speed, maintaining an air/fuel ratio of the engine, flowing exhaust from the engine through an exhaust system containing a catalyst, monitoring a first variable with a feedback sensor located upstream of the catalyst, and controlling the air/fuel ratio of the engine as a function of the variable.

In some cases the first variable is oxygen and/or the feedback sensor is a narrow-band oxygen sensor. In some cases, the first variable is monitored with a MEMS device. In some embodiment, the method further includes monitoring a second variable with an exhaust sensor located downstream of the catalyst. In some embodiments, the second variable is carbon monoxide. In some other embodiments, the second variable is oxygen and/or the exhaust sensor is a wide-band oxygen sensor.

In a preferred embodiment, the air/fuel ratio is stoichiometric. In other embodiments, the air/fuel ratio is slightly lean. In some embodiments, the air/fuel ratio with is controlled with electronic fuel injection. In one embodiment, the electronic fuel injection is throttle-body fuel injection. In other embodiments, the electronic fuel injection is multi-point fuel injection. The the electronic fuel injection can be synchronized external fuel injection. Alternatively, the the electronic fuel injection can be nonsynchronized external fuel injection. In still other embodiments, the electronic fuel injection is direct fuel injection.

In one embodiment, the catalyst is configured to simultaneously reduce oxides of nitrogen, carbon monoxide and hydrocarbons. In some preferred embodiments, the catalyst is configured to reduce carbon monoxide to between about 9 parts per million and between about 30 parts per million. In one presently preferred embodiment, the catalyst is configured to reduce carbon monoxide to ambient levels.

In one embodiment, the engine is configured for marine applications and the exhaust system further comprises a water-jacketed manifold. In some cases, the engine is driving an electric generator. In one application, the generator is a multi-pole permanent magnet generator. In some embodiments, the generator is configured to operate at variable speeds. In some embodiments, the generator modulates between a high speed and a low speed having a ratio of 3 to 1. In other embodiments, the generator modulates between a high speed and a low speed having a ratio of 2 to 1.

In another aspect, the method includes driving an electric generator with the engine configured for marine applications, governing engine speed with respect to a selected constant speed, maintaining an air/fuel ratio of the engine, flowing exhaust from the engine through an exhaust system containing a catalyst, monitoring a first variable with a feedback sensor located upstream of the catalyst, the catalyst being configured to simultaneously reduce oxides of nitrogen, carbon monoxide and hydrocarbons, and controlling the air/fuel ratio of the engine as a function of the variable with electronic fuel injection.

In some embodiments, the method also includes monitoring a second variable downstream of the catalyst with an exhaust sensor downstream of the catalyst and providing a warning to an operator when the second variable reaches a threshold level. In some cases, the second variable is carbon monoxide. In other applications, the second variable is oxygen.

In some embodiments, the exhaust sensor is a wide-band oxygen sensor. In some embodiments, the generator is a permanent magnet generator. In some cases, the second variable is carbon monoxide. The other cases, the second variable is oxygen.

In a preferred embodiment, the air/fuel ratio is stoichiometric. In other embodiments, the air/fuel ratio is slightly lean.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
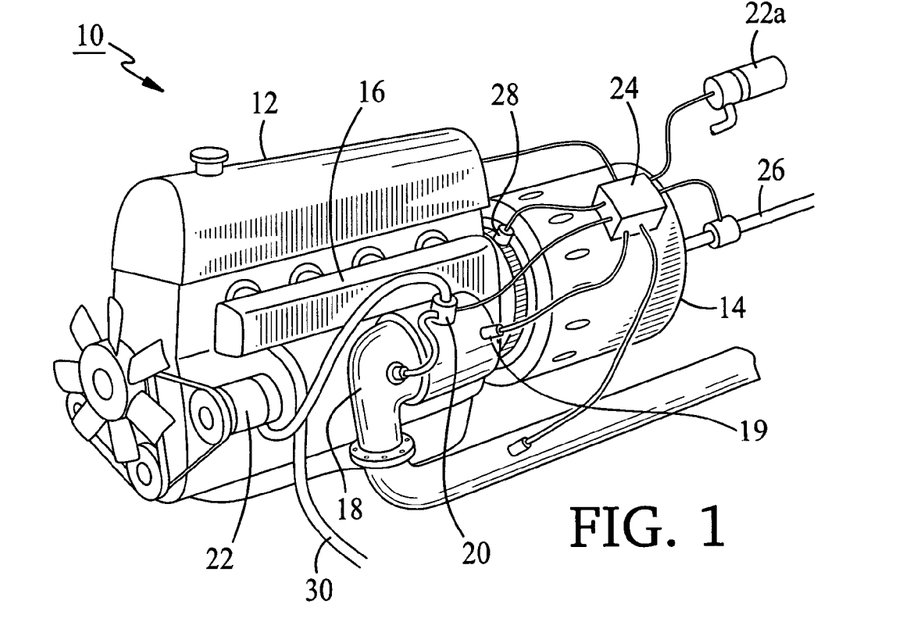
FIG. 1 is a perspective view of a marine engine-generator set.

Referring first to FIG. 1, an engine-generator set 10 includes an internal combustion engine 12 driving an electrical generator 14. Engine 10 has an exhaust manifold 16 that receives and combines exhaust gasses from each cylinder of the engine and directs the combined exhaust gasses through a catalyst contained within the manifold, as is discussed in more detail below. Secured to the outlet of the manifold 16 is an exhaust elbow 18. In a marine application, water, such as cold seawater, is supplied to manifold 16 through hose 30. The water is directed through cooling passages in manifold 16 and elbow 18 to keep the outer surfaces of the exhaust system at or below a desired temperature, and is then injected into the exhaust stream in elbow 18, downstream of the catalysts, to cool the exhaust.

In one embodiment, a variable is monitored with a feedback sensor 19 located upstream of the catalyst which provides a control signal to electronic controller 24. In one embodiment, controller 24 provides controls the air fuel ratio of the engine 12 to correspond to a 1.0 stoichiometric ratio. In other embodiments, the air fuel ratio of the engine 12 is slightly lean. In one embodiment, the variable monitored by the feedback sensor 19 is oxygen and the feedback sensor 19 is a narrow-band oxygen sensor.

In one embodiment, an exhaust sensor 23 is mounted downstream of the catalyst. In one embodiment, the exhaust sensor 23 measures oxygen as a proxy for indirectly determining the level of carbon monoxide. In this application, a wide-band oxygen sensor can be used. In other applications, the exhaust sensor 23 directly measures carbon monoxide. The signal output from the exhaust sensor 23 can provide an anticipatory alarm apprising an operator when the catalyst 32 is functioning with reduced effectiveness. Accordingly, the exhaust sensor can inform the operator if the catalyst 32 has been damaged by seawater and requires replacement. The exhaust sensor 23 can be a MEMS device in some embodiments.

With continued reference to FIG. 1 and in an alternative embodiment, air is delivered to manifold 16, through a controllable dump valve 20, from belt-driven air pump 22. A fixed speed, electric air pump may also be employed. Valve 20 is controlled by an electronic controller 24 to moderate the flow of air into manifold 16 as a function of the load placed on engine 12, such as by controllably dividing the output of the air pump between manifold 16 and exhaust elbow 18. Controller 24 varies a signal to valve 20 as a function of engine load, or as a function of a sensible parameter that changes with engine load. In the illustrated embodiment, controller 24 senses an output voltage and/or current of generator 14, such as at generator output 26, and controls valve 20 accordingly. Controller 24 also senses engine speed, such as by receiving a signal from flywheel magnetic reluctance sensor 28, and controls engine inputs (such as fuel and/or air flow) to maintain engine speed at or near a desired set point, so as to maintain the frequency of generator 14. As an alternative to controlling a dump valve 20 splitting pump air flow between manifold 16 and either atmosphere or a lower point in the exhaust stream, a variable speed electric air pump 22a is employed in some instances, with controller 24 varying the operating speed of pump 22a as a function of engine load. In such cases, the entire output of pump 22a is preferably ported directly to manifold 16.

Figure 2:
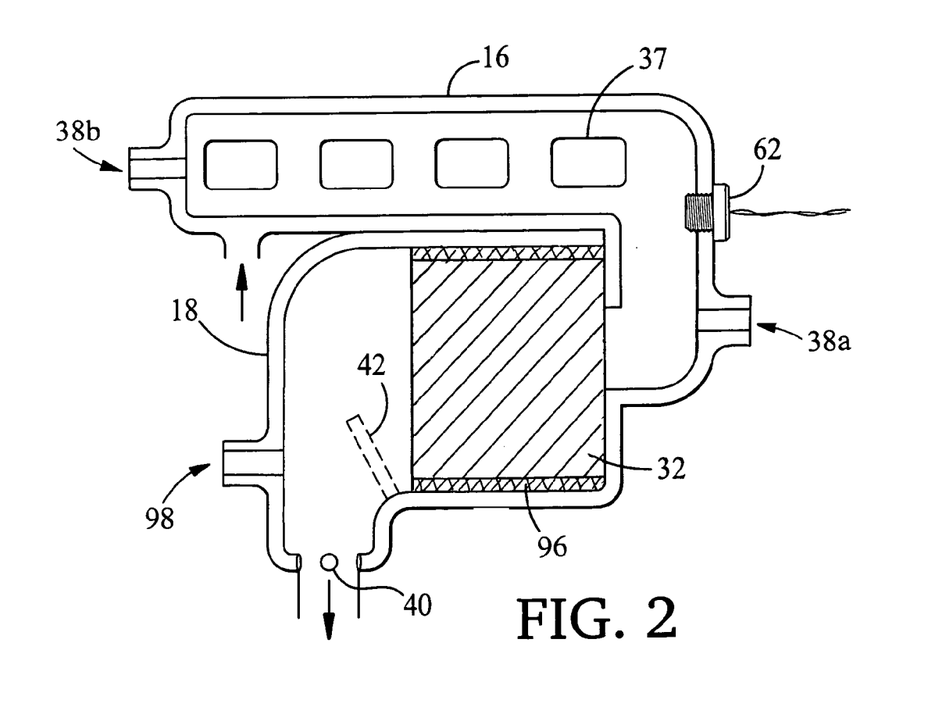
FIG. 2 is a schematic cross-section illustrating flow through the exhaust manifold and elbow of the engine-generator set of FIG. 1.

Referring to now FIG. 2, a cylindrical catalyst 32 containing a catalyst bed is shown disposed within the exhaust manifold 16. The catalyst 32 is wrapped in an insulating blanket 96, such as a ⅛ inch (3.2 millimeter) thick sheet of cotton binding containing mica, for example, that helps reduce heat transfer from the catalyst into the housing and also helps to isolate the delicate catalyst bed from shocks and vibrations. In one embodiment, controlled air flow is injected either just forward of the catalyst at port 38a, or at the far end of the manifold at port 38b so as to preheat the injected air flow. Single catalyst 32 may be of any preferred composition, such as a palladium-platinum catalyst, for example. In other embodiments, no air flow injection is required.

With continued reference to FIG. 2 and in one embodiment, catalyst 32 is configured and dimensioned for fitting within a marine exhaust manifold 16. In one presently preferred embodiment, the catalyst 32 has a diameter of 3.66 inch (9.30 cm) and a length of 6.0 inch (15.24 cm). The catalyst 32 can include a round ceramic having a diameter of 3.0 inch (7.62 cm) and a length of 6.0 inch (15.24 cm) and a 400-cells per inch with 95-grams per cubic foot of a 3-to-1 ratio of platinum to rhodium. The catalyst 32 can also include a specialized wash coat designed to be the most effective at a 1.0 stoichiometric air fuel ratio. The catalyst 32 is configured to simultaneously reduce oxides of nitrogen, carbon monoxide and hydrocarbons. In one preferred embodiment, the catalyst 32 is configured to reduce carbon monoxides levels to below 50 part per million, preferably to below 35 parts per million, and most preferably to below ambient levels, i.e., 9 part per million.

Figure 3:
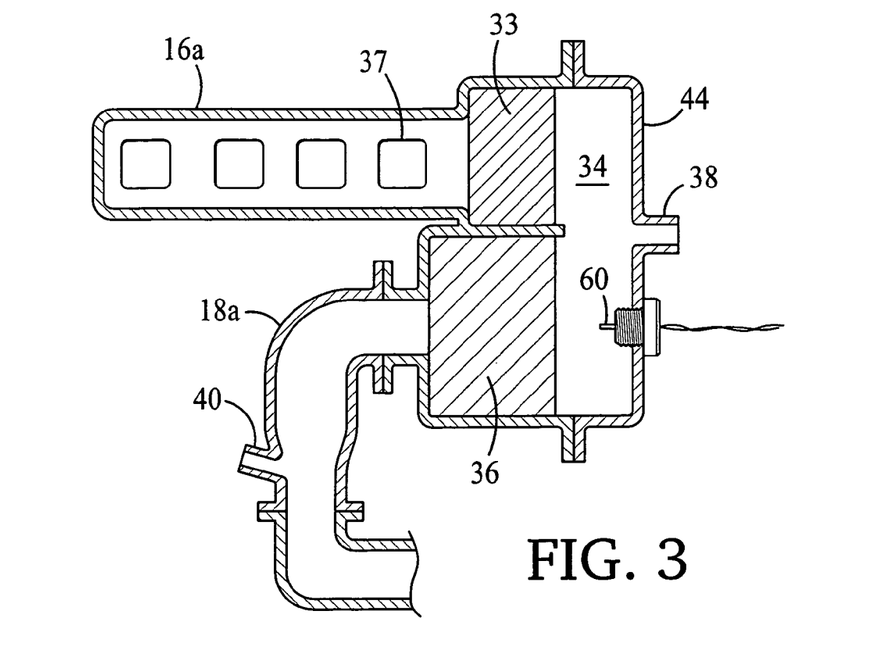
FIG. 3 illustrates an alternative second exhaust manifold construction and catalyst arrangement.

Other catalyst configuration are contemplated within the exhaust manifold 16. For example as illustrated in FIG. 3, the catalyst 32 in an alternative embodiment can include a first catalyst 33 and second catalyst 36 contained within a second bore of the manifold, parallel to and offset from the first bore. The manifold can be equipped with a removable cover 44 through which the air is injected, enabling loading of both of the catalysts into their respective bores. As in the first illustrated embodiment, after flowing through both catalyst beds the exhaust flow is combined with cooling water in elbow 18a.

The exhaust is combined and directed through a first catalyst bed 32, through a space 34, and then through a second catalyst bed 36. The air is injected into the manifold in space 34, through air inlet 38. Cooling water flows around both catalyst beds, through appropriate channels cast into manifold 16a and elbow 18, and is then injected into the exhaust flow. In marine applications where the cooling seawater can have a high salt content, the water injection outlets 40 in elbow 18 are preferably at least about six inches (15 centimeters) below the lowest edge of the catalysts or the upper edge of any internal elbow baffles 42 positioned to avoid salt water splash on the hot catalysts. Also, it is preferred that for such marine applications manifold 16a and elbow 18 be cast of a corrosion-resistant material, such as an aluminum-magnesium alloy. It will be apparent from FIG. 2 that the connection between manifold 16a and elbow 18 can be readily positioned between the two catalyst beds, such that second catalyst 36 is carried within elbow 18.

The construction of the catalyst 32 according to this embodiment can include a first catalyst bed 33 which preferably includes a catalyst such as one containing rhodium as the precious metal, selected to reduce hydrocarbon and $NO_x$ emissions. For example, one preferred catalyst bed is in the form of a cylinder 3.0 inches (76 millimeters) in diameter and 2.6 inches (6.7 centimeters) long. The ceramic substrate has a cross-sectional area of about 7 square inches (45 square centimeters) and has about 400 cells per square inch (62 per square centimeter), and is washed with 6.1 grams per cubic foot (0.06 grams per cubic centimeter) of rhodium. Such a catalyst bed is available from ASEC/Delphi Exhaust and Engine Management of Flint, Mich. Catalysis efficiency within first catalysis bed 33 may be accomplished by various methods known in the art, either in carbureted or fuel-injected systems with oxygen sensors, to remove as much of the overall emissions components as possible.

The second catalyst bed 36 contains a catalyst selected to further reduce CO emissions. In one arrangement, second catalyst bed 36 contains a three to one ratio of palladium and platinum, carried on a honey-combed substrate of ceramic or metal. The active precious metals are washed onto the substrate and then heated to set the metals onto the surface as known in the art. An example of a preferred second catalyst bed is a metal substrate in the form of a cylinder of 5.0 inch (12.7 centimeter) diameter and 6.3 inch (16 centimeter) length, with 19.6 square inches (126 square centimeters) of cross-sectional area, washed with 40 grams per cubic foot (0.4 grams per cubic centimeter) each of palladium and platinum. Such a catalyst is available from Miratech of Tulsa, Okla., for example. Second catalyst 36 will tend to run hotter, such as perhaps about 400 degrees Fahrenheit (220 degrees Celsius) hotter than the rhodium catalyst. Preferably, the temperature of the combined air and exhaust entering the second catalyst is about 1000 degrees Fahrenheit (540 degrees Celsius).

Figure 4:
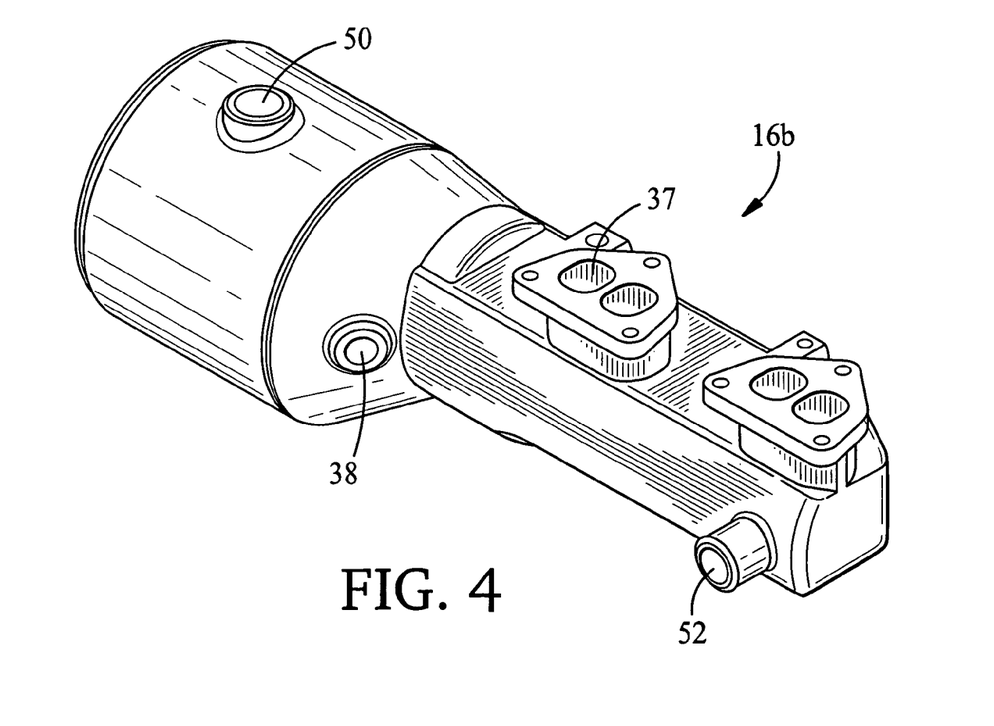
FIG. 4 is a perspective view of an engine exhaust manifold.
Figure 5:
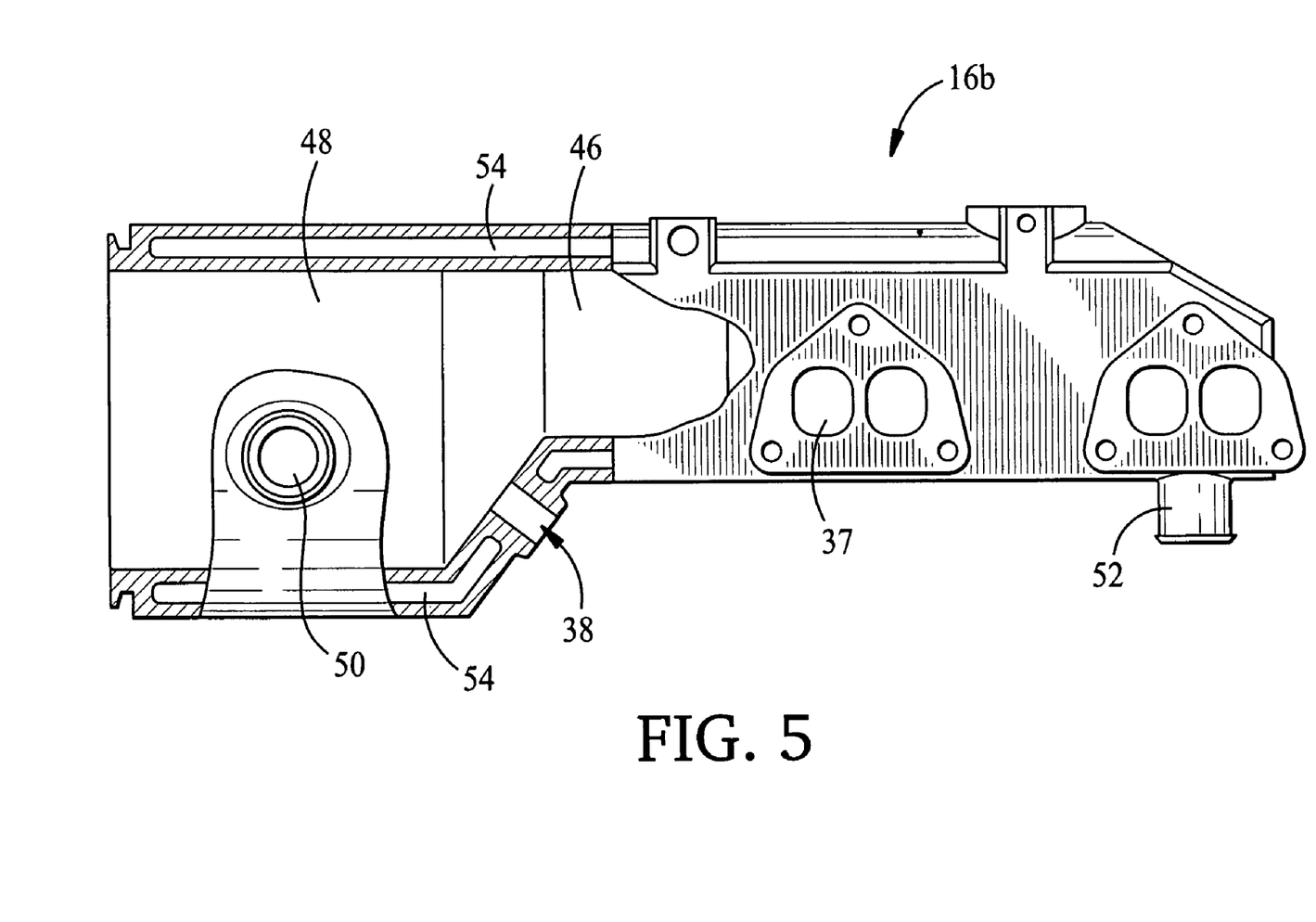
FIG. 5 is a partial cross-sectional view of the manifold of FIG. 4.

FIGS. 4 and 5 show another example of a catalyst exhaust manifold 16b. The catalyst 32 is loaded as a cylinder from the large end of the manifold, with the $NO_x$ catalyst loaded into bore 46 (FIG. 5) and the CO catalyst loaded into bore 48 (FIG. 5). In this example, coolant enters the manifold at inlet 50 and leaves the manifold at outlet 52, without joining the exhaust stream. The cooling channels 54 cast into the manifold are partially shown in FIG. 5, providing a closed flow path between inlet 50 and outlet 52.

Various control techniques may be employed to vary air injection rate for good CO reduction. In one embodiment, the air injection rate is varied as a function of approximate engine load. In one test using a Westerbeke 4-cylinder, 1.5 liter gasoline engine and the palladium-platinum second catalyst bed described above, the lowest CO emissions were provided by varying the rate of air flow into the manifold ahead of the second catalyst (at 100 liter per minute graduations) according to the following table:

| Engine Load (Percent Full Load) | Air Flow Rate (liters per minute) |
| --- | --- |
| 100 | 500 |
| 75 | 500 |
| 50 | 500 |
| 25 | 400 |
| 10 | 300 |
| 0 | 300 |

Of course, optimal air flow rates will be different for different applications. The air flow controller can be configured to interpolate between adjacent entries in the load-air correlation table to provide finer control sensitivity.

There are various ways to determine approximate engine load, such that a table like that shown above can be used to determine an optimal air injection rate. For example, if substantially all of the engine load is provided by an electrical generator (as shown in FIG. 1), monitoring the electrical output of the generator can provide a good estimate of engine load. Current can be monitored as a most direct measure of electrical load, such as by providing a current transformer about the output of the generator. In some cases in which generator voltage is known to predictably decrease a measurable amount with load, voltage may alternately be monitored. In most cases, however, current monitoring is preferred for systems with proper generator voltage regulation. Other options include measuring engine output driveshaft torque (or some measurable parameter that varies predictably with torque), or measuring the pressure within the manifold, such as upstream of the catalyst beds, or exhaust backpressure below the catalysts and above a muffler or other exhaust restriction. Because the engine speed is substantially fixed in the primary embodiments, other parameters may also be found to vary predictably with engine load, such as throttle position and fuel flow rate, for example.

As an alternative to controlling the air injection rate as a function of load, the air injection rate can be controlled as a function of other measured parameters that signify catalysis efficiency. For example, a CO sensor may be provided downstream of the catalyst as described above.

With renewed reference to FIG. 2 an in one embodiment, an exhaust pressure sensor 62 can be placed in the manifold 16, to measure exhaust manifold pressure, or downstream of the catalyst 32 to measure exhaust backpressure developed upstream of a muffler or other exhaust restriction (not shown). If the air pump delivering air to inlet 38 is not a fixed displacement pump, changes in exhaust backpressure with engine load can cause a significant fluctuation in the injected air rate. This fluctuation will tend to work against the desired variation of air flow rate with engine load, as backpressure, which rises with engine load, will cause a reduction in air injection rate that should be accounted for in the control of the pump or valve. It will be understood that sensors 62 are shown in optional and alternative locations, and are not necessary in some embodiments, such as when air flow rate is controlled as a function of generator current or some other primary control parameter.

Figure 6:
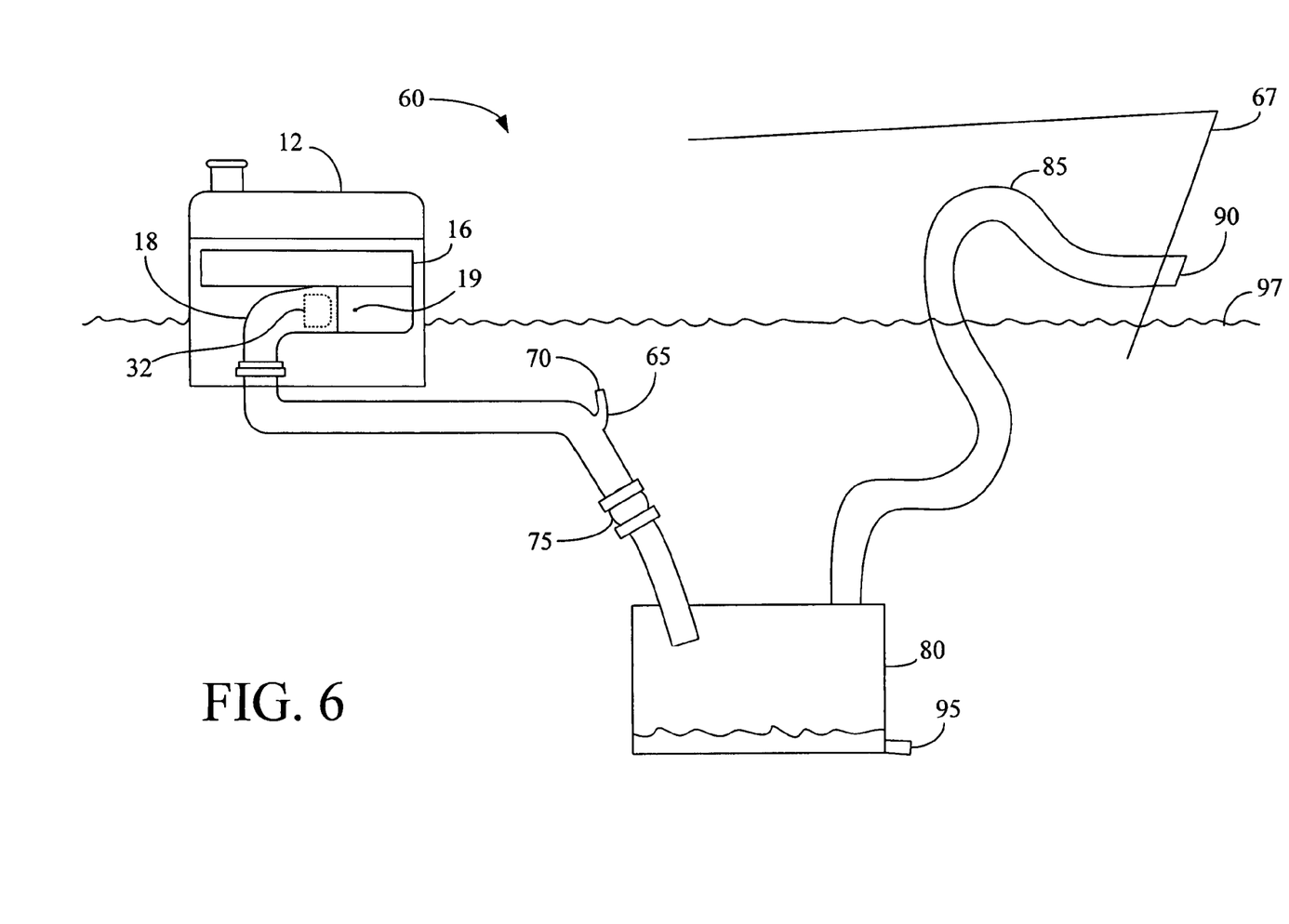
FIG. 6 shows a schematic view of a marine exhaust system according to the invention.

Referring now to FIG. 6, an exhaust system 60 for the engine 12 mounted in a boat 67 is shown. The exhaust manifold 16 directs exhaust gases through the catalyst 32 and exhaust elbow 18 and past a water injected exhaust elbow 65. To reduce the operating temperature of the exhaust components, cooling seawater is injected at the inlet to the exhaust elbow 70. The exhaust gases and cooling water then pass through an exhaust valve and water level indicator 75 (discussed in more detail below). The exhaust gasses and cooling water enter a water lift marine muffler 80 before proceeding to a high point at the U-bend 85 and out of the boat through the through-hull fitting 90 above the water line 97. In one embodiment, the muffler 80 includes a drain 97.

Figure 7:
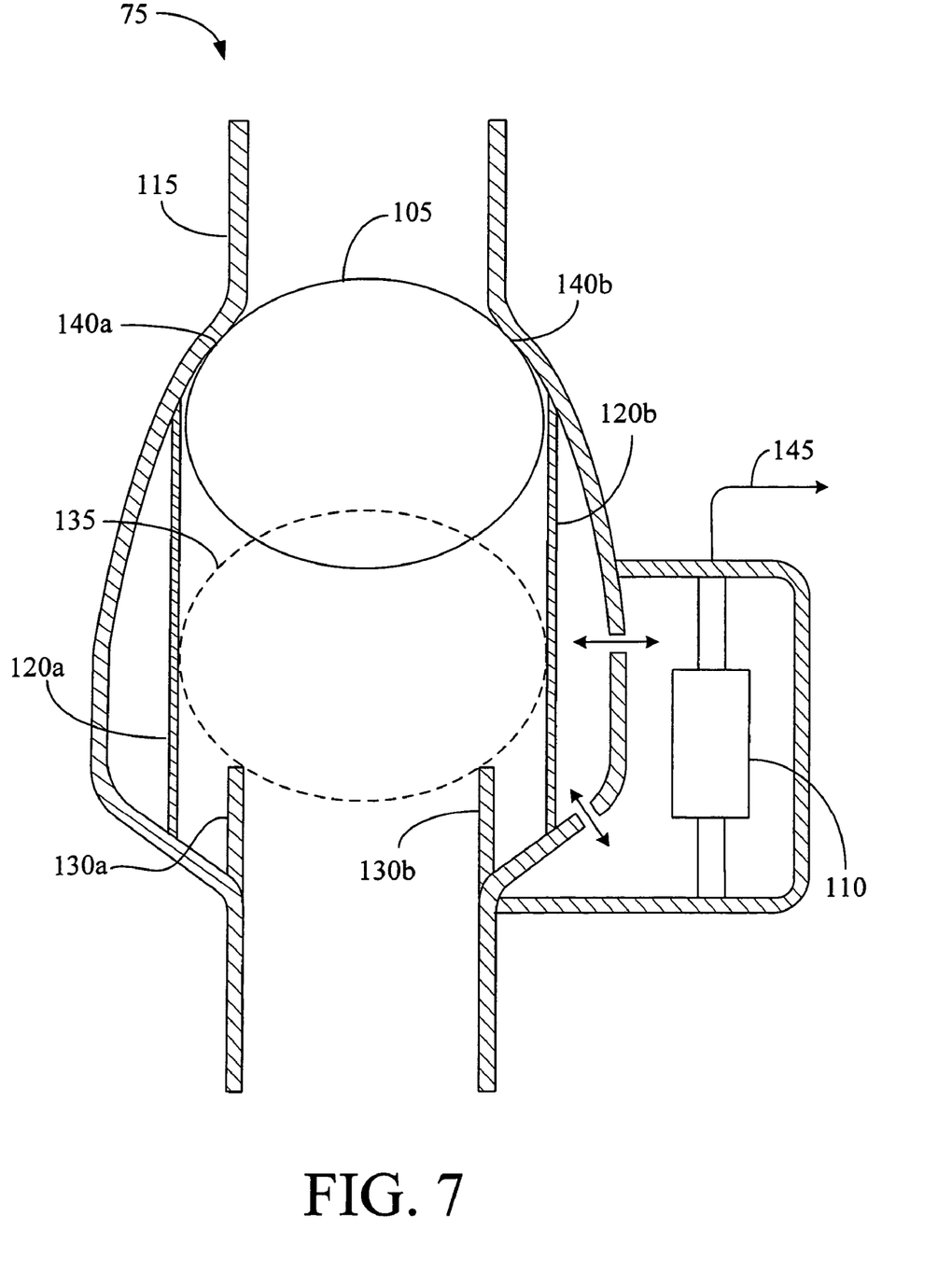
FIG. 7 is a detail view of a float valve and water level indicator contained within the marine exhaust system.

In marine applications, it is desirable to prevent cooling seawater from contacting the catalyst 32 disposed within the exhaust manifold 16. It is also desirable to prevent cooling seawater from reaching the engine 12, which can results in catastrophic failure. Referring to FIG. 7, an exhaust valve and water level indicator 75 are shown and disposed within the marine exhaust manifold 16 between the water injected exhaust elbow 65 and the water lift muffler 80 (FIG. 6). The valve/indicator 75 can include a float valve 105, such as a ball valve and a water level indicator 110 combined in a housing 115. The ball valve 105 translates along the housing 115 between ball valve guides 120a, 120b and is supported by ball valve supports 130a, 130b when the ball valve is disposed in an open position 135 (shown in phantom). When the ball valve 105 ascends upward to the closed position (as shown) the surface of the ball valve 105 contacts the housing 115 along valve sealing areas 140a, 140b thereby closing the valve. The rising water level within the housing 115 floats the water level indicator 110 upward to an alarm level which provides a signal 145 to warn an operator that the muffler 80 is overfilled.

A number of embodiments of the invention have been described. For example, the engine 12 as described above can be used for propulsion in marine applications. Nevertheless, it will be understood that various modifications may be made without departing from the spirit and scope of the invention. Accordingly, other embodiments are within the scope of the following claims.

What is claimed is:

1. A method of controlling emissions from an internal combustion engine, the method comprising:
   governing engine speed with respect to a selected constant speed while maintaining an air/fuel ratio of the engine and driving a variable load on the engine;
   flowing exhaust from the engine through an exhaust system containing a catalyst;
   injecting liquid coolant into the exhaust;
   monitoring a first exhaust variable with an exhaust feedback sensor located upstream of the catalyst; and
   controlling the air/fuel ratio of the engine as a function of the variable.

2. The method of claim 1 wherein the air/fuel ratio is stoichiometric.

3. The method of claim 1 wherein the air/fuel ratio is slightly lean.

4. The method of claim 1 wherein the second variable is monitored with a micro-electro-mechanical systems device.

5. The method of claim 1 wherein the first variable is oxygen.

6. The method of claim 5 wherein the sensor is a narrow-band oxygen sensor.

7. The method of claim 1 further comprising monitoring a second variable with an exhaust sensor located downstream of the catalyst and providing a warning to an operator when the second variable reaches a threshold level.

8. The method of claim 7 wherein the second variable is carbon monoxide.

9. The method of claim 7 wherein the second variable is oxygen.

10. The method of claim 9 wherein the exhaust sensor is a wide-band oxygen sensor.

11. The method of claim 1 further comprising controlling the air/fuel ratio with electronic fuel injection.

12. The method of claim 11 wherein the electronic fuel injection is throttle-body fuel injection.

13. The method of claim 11 wherein the electronic fuel injection is multi-point fuel injection.

14. The method of claim 13 wherein the electronic fuel injection is synchronized external fuel injection.

15. The method of claim 13 wherein the electronic fuel injection is nonsynchronized external fuel injection.

16. The method of claim 13 wherein the electronic fuel injection is direct fuel injection.

17. The method of claim 1 wherein the catalyst is configured to simultaneously reduce oxides of nitrogen, carbon monoxide and hydrocarbons.

18. The method of claim 17 wherein the catalyst is configured to reduce carbon monoxide to between about 9 parts per million and about 30 parts per million.

19. The method of claim 17 wherein the catalyst is configured to reduce carbon monoxide to ambient levels.

20. The method of claim 1 wherein the engine is configured for marine applications and the exhaust system further comprises a water-jacketed manifold.

21. The method of claim 20 wherein the engine is driving an electric generator.

22. The method of claim 21 wherein the generator is a multi-pole permanent magnet generator.

23. The method of claim 22 wherein the generator is configured to operate at variable speeds.

24. The method of claim 23 wherein the generator modulates between a high speed and a low speed having a 3 to 1 ratio.

25. The method of claim 23 wherein the generator modulates between a high speed and a low speed having a 2 to 1 ratio.

26. A method of controlling emissions from an internal combustion engine configured for marine application, the method comprising:
   driving an electric generator with the engine;
   governing engine speed with respect to a selected constant speed while maintaining an air/fuel ratio of the engine and driving a variable load on the engine;
   flowing exhaust from the engine through an exhaust system containing a catalyst;
   injecting liquid coolant into the exhaust;
   monitoring a first exhaust variable with an exhaust feedback sensor located upstream of the catalyst, the catalyst being configured to simultaneously reduce oxides of nitrogen, carbon monoxide and hydrocarbons; and
   controlling the air/fuel ratio of the engine as a function of the variable with electronic fuel injection.

27. The method of claim 26 wherein the generator is a permanent magnet generator.

28. The method of claim 26 wherein the air/fuel ratio is stoichiometric.

29. The method of claim 26 wherein the air/fuel ratio is slightly lean.

30. The method of claim 26 further comprising monitoring a second variable downstream of the catalyst with an exhaust sensor downstream of the catalyst and providing a warning to an operator when the second variable reaches a threshold level.

31. The method of claim 30 wherein the second variable is carbon monoxide.

32. The method of claim 30 wherein the second variable is oxygen.

33. The method of claim 32 wherein the exhaust sensor is a wide-band oxygen sensor.

34. The method of claim 30 wherein the second variable is carbon monoxide.

35. The method of claim 30 wherein the second variable is oxygen.

36. A method of controlling emissions from an internal combustion engine configured for marine application, the method comprising:

governing engine speed with respect to a selected constant speed while maintaining an air/fuel ratio of the engine and driving a variable load on the engine;

flowing exhaust from the engine through an exhaust system containing a catalyst;

injecting liquid coolant into the exhaust downstream of the catalyst;

monitoring a first exhaust variable with an exhaust feedback sensor located upstream of the catalyst, the catalyst being configured to reduce oxides of nitrogen, carbon monoxide and hydrocarbons; and controlling the air/fuel ratio of the engine as a function of the variable with electronic fuel injection.

37. The method of claim 36 wherein the air/fuel ratio is stoichiometric.

38. The method of claim 36 wherein the air/fuel ratio is slightly lean.

39. The method of claim 36 wherein injecting liquid coolant comprises injecting the liquid coolant at least about six inches below the lowest edge of the catalyst.

* * * * *

(12) EX PARTE REEXAMINATION CERTIFICATE (10246th)
United States Patent
Westerbeke, Jr.

(10) Number: US 7,832,196 C1
(45) Certificate Issued: Aug. 6, 2014

(54) ELECTRONIC EMISSIONS CONTROL

(75) Inventor: John H. Westerbeke, Jr., Milton, MA (US)

(73) Assignee: WBIP, LLC, Taunton, MA (US)

Reexamination Request:
No. 90/013,090, Dec. 9, 2013

Reexamination Certificate for:
Patent No.: 7,832,196
Issued: Nov. 16, 2010
Appl. No.: 10/974,380
Filed: Oct. 27, 2004

Related U.S. Application Data

(60) Provisional application No. 60/515,166, filed on Oct. 27, 2003.

(51) Int. Cl.
*F01N 3/00* (2006.01)

(52) U.S. Cl.
USPC .................... 60/285; 60/310; 60/276; 60/274

(58) Field of Classification Search
None
See application file for complete search history.

(56) References Cited

To view the complete listing of prior art documents cited during the proceeding for Reexamination Control Number 90/013,090, please refer to the USPTO's public Patent Application Information Retrieval (PAIR) system under the Display References tab.

*Primary Examiner* — William Doerrler (57) ABSTRACT

A method of controlling emissions from an internal combustion engine including governing engine speed with respect to a constant speed, maintaining an air/fuel ratio of the engine, flowing exhaust from the engine through an exhaust system containing a catalyst, monitoring a variable with a feedback sensor located upstream of the catalyst, and controlling the air/fuel ratio of the engine as a function of the variable. In one application, the engine is configured for marine applications, including electric power generation and propulsion.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-39 is confirmed.

* * * * *